United States Patent

Zushi et al.

[11] Patent Number: 5,423,568
[45] Date of Patent: Jun. 13, 1995

[54] AIR BAG DEVICE WITH AN INFLATOR MOUNTING STRUCTURE

[75] Inventors: Takayasu Zushi; Motonobu Kitagawa; Kazuhiko Yamakawa; Masato Kuretake; Yoshimi Yoshida; Sawayo Uda, all of Shiga, Japan

[73] Assignee: Takata Corporation, Tokyo, Japan

[21] Appl. No.: 140,975

[22] Filed: Oct. 20, 1993

[30] Foreign Application Priority Data

Oct. 30, 1992 [JP] Japan .................................. 4-292922

[51] Int. Cl.⁶ ........................................... B60R 21/16
[52] U.S. Cl. .................... 280/728.2; 280/741; 403/349
[58] Field of Search .............. 280/728 A, 730 R, 731, 280/732, 736, 741; 403/349

[56] References Cited

U.S. PATENT DOCUMENTS

| 1,605,305 | 11/1926 | Vinje | 403/349 |
| 2,444,758 | 7/1948 | Stillbach | 403/349 |
| 3,827,715 | 8/1974 | Lynch | 280/731 |
| 4,943,086 | 7/1990 | Cunningham | 280/741 |
| 5,277,442 | 1/1994 | Cuevas | 280/731 |

FOREIGN PATENT DOCUMENTS 62-77281  4/1987  Japan ...................................... 74/552

Primary Examiner—Karin L. Tyson
Attorney, Agent, or Firm—Kanesaka & Takeuchi

[57] ABSTRACT

A bag holding member has an opening where the inflator is inserted. The member has a cylindrical wall projecting coaxially with the opening. The inflator extends through the cylindrical wall. The cylindrical wall has slits extending spirally. The inflator has pins projecting from its outer periphery. The pins engage the slits respectively to secure the inflator to the cylindrical wall.

6 Claims, 5 Drawing Sheets

AIR BAG DEVICE WITH AN INFLATOR MOUNTING STRUCTURE

FIELD OF THE INVENTION

The present invention relates to an air bag device having an air bag which extends upon collision of a vehicle to protect an occupant, and more particularly, to a mounting structure of an inflator to a bag retainer, or a container.

DESCRIPTION OF THE RELATED ART

An air bag device which is installed in front of a seat in an automobile, as on a steering device, or an instrument panel, is intended for protecting an occupant in cases of emergency, such as collision, by extending an air bag rapidly by pressure of a gas released from a gas generator called an inflator.

FIG. 6 is an elevational view, partly in section, showing a conventional air bag device for a driver of a vehicle, FIG. 7 is an enlarged view of part A of FIG. 6, and, FIG. 8 is an exploded perspective view showing a structure for an inflator.

A member 10 for holding an air bag, which is called a retainer, has a central opening(inflator mounting hole) 12 in which an inflator 14 is fitted.

The air bag 16 has an opening 18 where the inflator 14 is inserted. The opening 18 is arranged coaxially with the hole 12. An edge portion of the opening 18 is held to the retainer 10 by a holding ring 20. A reference numeral 17 in FIG. 8 shows a reinforcing cloth.

The air bag 16 is kept in an extensibly folded form, and is enclosed in a modular cover 22. The modular cover 22 is torn by the inflating pressure of the air bag 16 when the air bag 16 is extended by the gas released from the inflator 14.

Stud bolts 38 are secured to the holding ring 20. The bolts 38 are extended through bolt holes 40 of the air bag 16, bolt holes 42 of the retainer 10 and bolt holes 44 of a flange projecting from the inflator 14. The bolts 38 are tightened by nuts 46 to secure the air bag 16 and the inflater 14 to the retainer 10, as shown in FIG. 8.

As described above, the bolts 38 of the holding ring 20 are inserted into the bolt holes 40, 42 and 44, and then the nuts 46 are tightened therewith to mount the inflator 14 or the retainer 10. Such work or job for mounting the inflator 14 consumes great deal of time and labor.

OBJECT AND SUMMARY OF THE INVENTION

It is an object of this invention to provide an improved structure of an air bag device which facilitates the work of mounting an inflator.

This object is attained by an air bag device which comprises an air bag, an inflator for inflating the bag and a member holding the bag and having an opening through which the inflator projects into the bag.

The bag holding member has a cylindrical wall projecting coaxially with its opening from its edge surrounding its opening. The inflator extends through the cylindrical wall. The cylindrical wall has a plurality of slits extending spirally about its longitudinal axis.

The inflator has a plurality of protrusions projecting from its outer periphery. The protrusions are engaged in the slits respectively so as to secure the inflator to the cylindrical wall.

The inflator is mounted quite easily on the bag holding member by engaging the protrusions on the inflator with the slits, respectively, in the cylindrical wall of the bag holding member.

DESCRIPTION OF THE PREFERRED EMBODIMENTS

Figure 1:
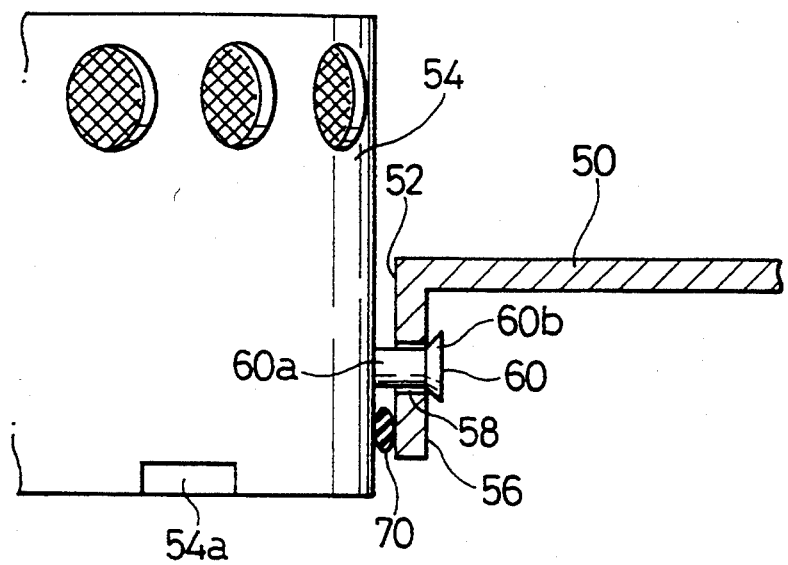
FIG. 1 is a fragmentary elevational view, partly in section, of a device embodying this invention.

Reference is made in further detail to FIGS. 1 to 4 showing an air bag device embodying this invention, and more particularly, a structure involving the connection of an inflator to a bag retainer. The device is intended for protecting a driver of a vehicle.

The bag retainer 50 holding an air bag (not shown) has an opening(inflator mounting hole) 52 through which the inflator 54 projects into the air bag. The bag retainer 50 has a cylindrical wall 56 projecting coaxially with its opening 52 from its edge surrounding the opening 52. The cylindrical wall 56 has four equally spaced apart slits 58 extending spirally about the longitudinal axis thereof. The inflator 54 has four equally spaced apart pins 60 projecting radially outwardly from its outer periphery, and engaged in the slits 58, respectively, to secure the inflator 54 to the cylindrical wall 56 and thereby to the bag retainer 50.

Figure 2:
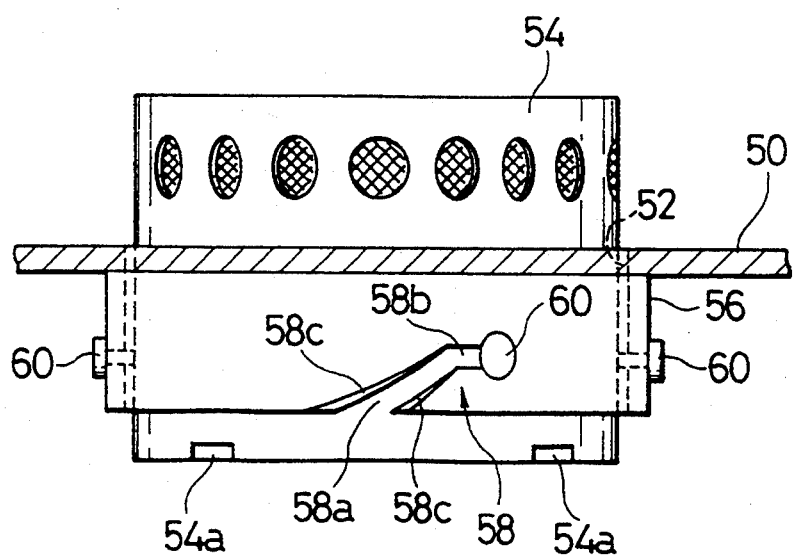
FIG. 2 is a side elavational view of the device embodying this invention.
Figure 3:
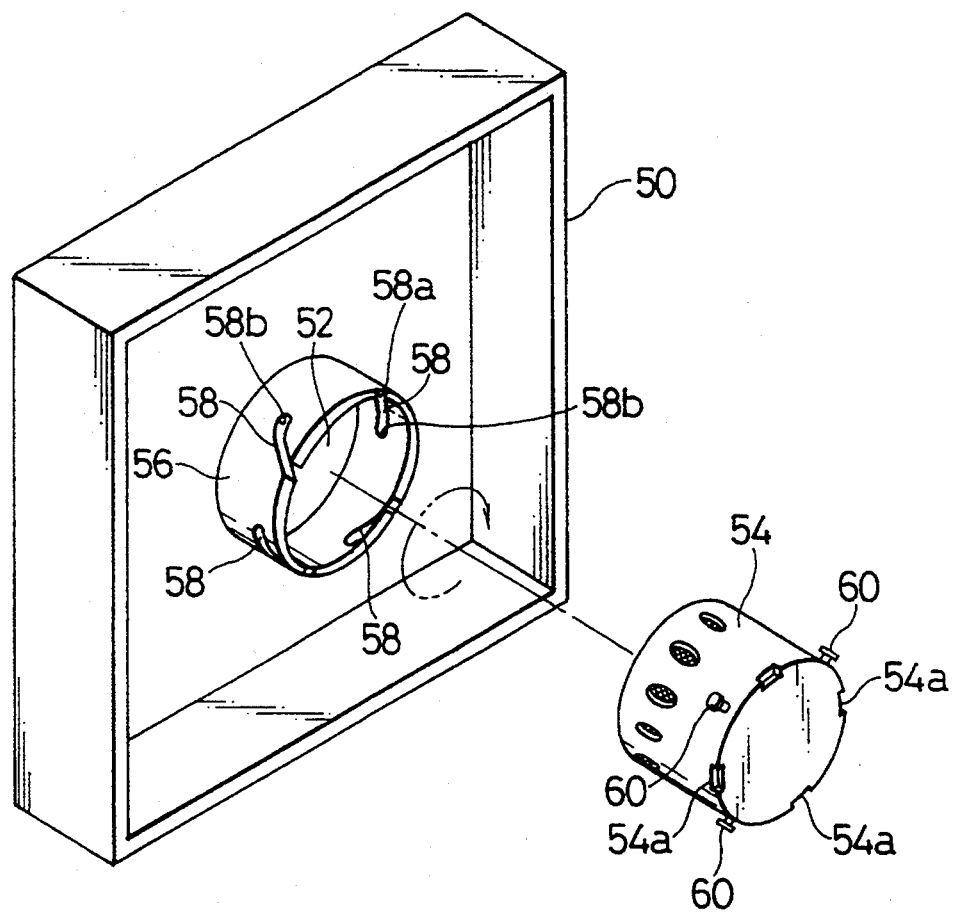
FIG. 3 is an exploded perspective view of the device embodying this invention.
Figure 4:
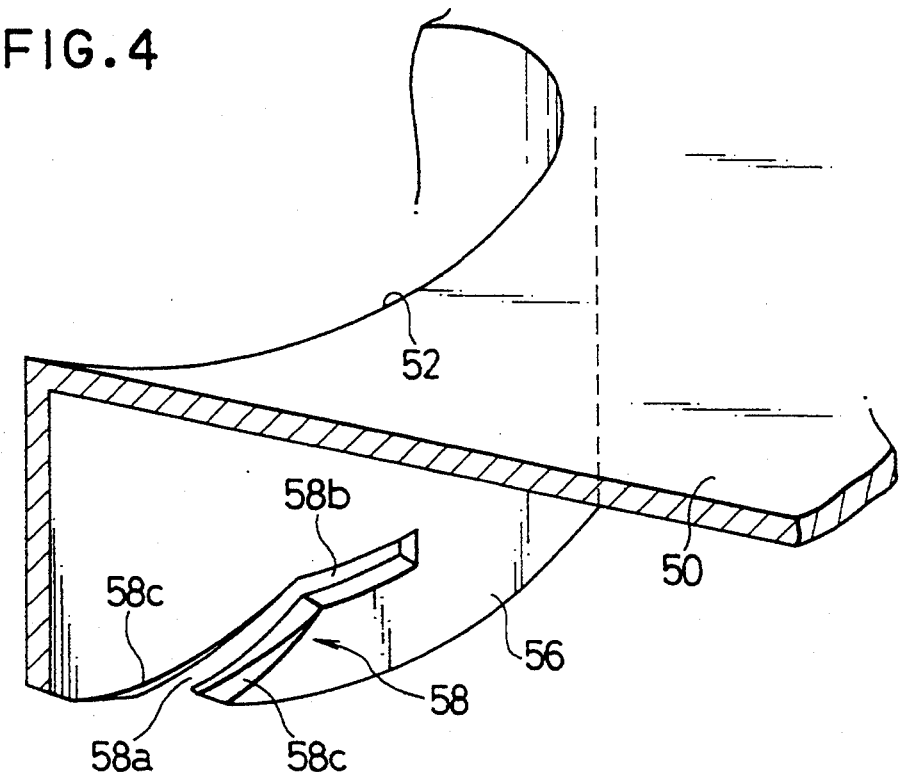
FIG. 4 is a fragmentary perspective view, partly in section, of the bag retainer employed in the device embodying this invention.

Each slit 58 has a greater width at an inlet 58a than an end portion 58b thereof, as is obvious from FIGS. 2 and 4, so that the pin 60 may be easily inserted in the slit 58 at its inlet end 58a. Each pin 60 consists of a straight shank 60a projecting from the inflator 54, and an enlarged head 60b having a peripheral surface tapered toward the shank 60a.

The cylindrical wall 56 has two beveled surfaces 58c formed along the longitudinal edges, respectively. The beveled surfaces 58c have a width which gradually decreases from the inlet 58a to the end portion 58b, so that the enlarged head 60b of the pin 60 may engage the beveled surfaces 58c more tightly toward the end portion 58b. Each slit 58 is so curved that the end portion 58b may extend substantially circumferentially of the cylindrical wall 56 and thereby hold the pin 60 against inadvertent detachment from the slit 58.

When the device is assembled, the pins 60 are put in the inlet ends 58a of the slits 58, respectively, and the inflator 54 is rotated spirally along the slits 58. When the pins 60 have been pulled into the end portions 58b of slits 58, the enlarged heads 60b of the pins 60 ride over the adjacent edges of the slits 58 at the portions 58b thereof, and thereby draw the outer periphery of the inflator 54 strongly toward the cylindrical wall 56, as shown in FIG. 1, whereby the inflator 54 is attached to the air bag retainer 50 so firmly as not to move at all.

The inflator 54 has around its rear or outer end a plurality of tool engaging grooves 54a which facilitate the rotation of the inflator 54 by a tool when the inflator 54 is mounted.

Figure 5:
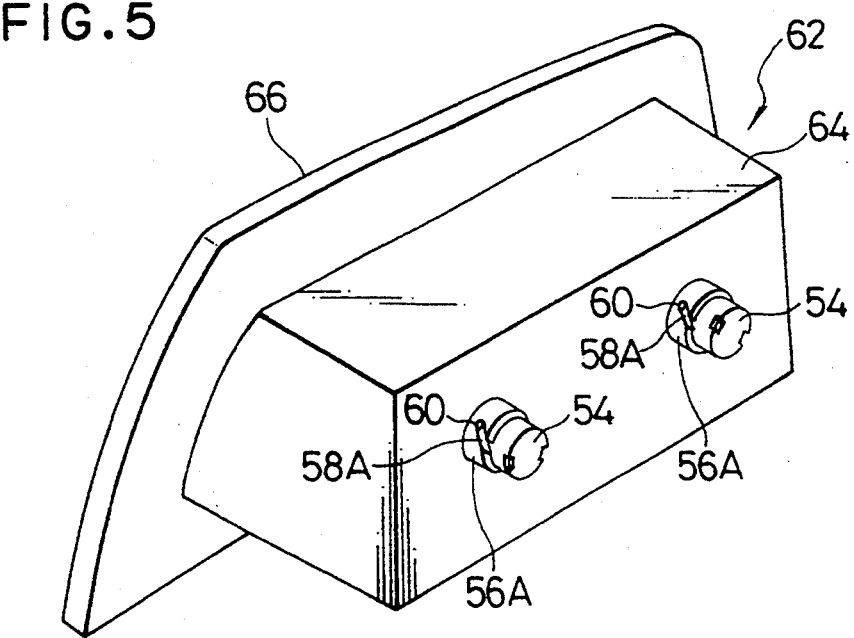
FIG. 5 is a perspective view of an air bag device for a passenger according to the invention.
Figure 6:
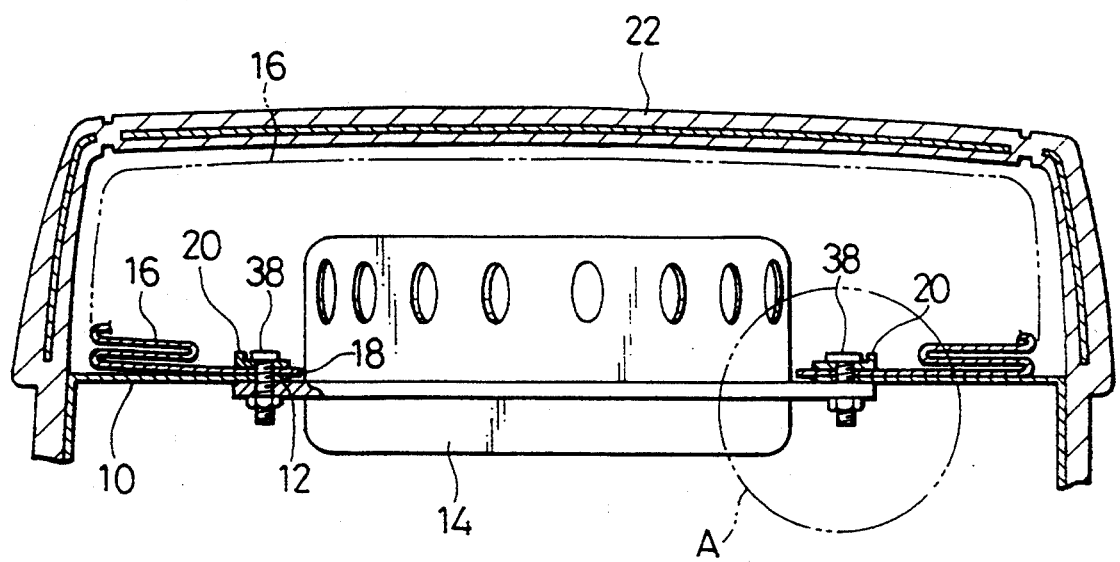
FIG. 6 is an elevational view, partly in section, of a conventional air bag device.
Figure 7:
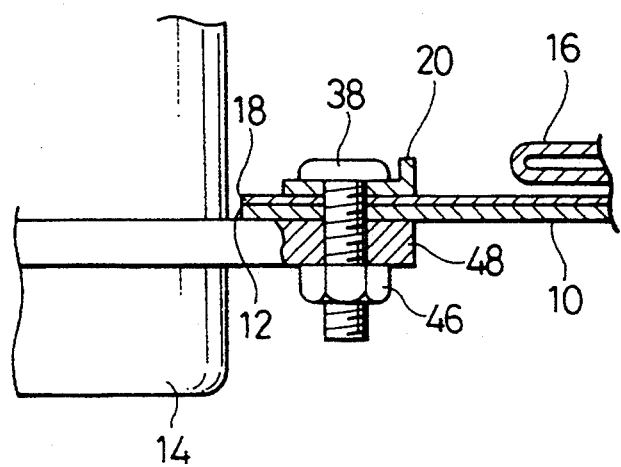
FIG. 7 is an enlarged view of part A of FIG. 6.
Figure 8:
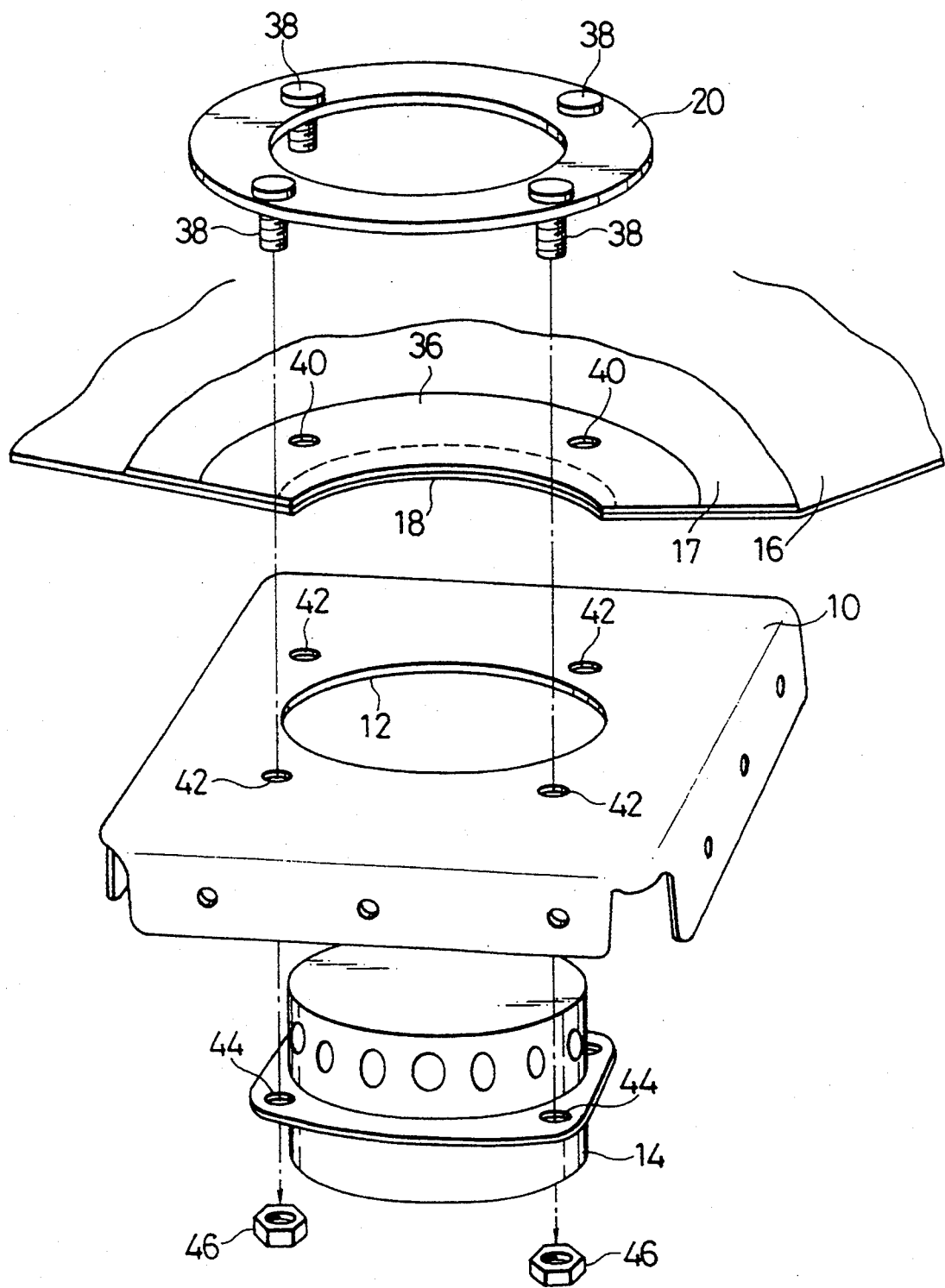
FIG. 8 is an exploded perspective view of the conventional device.

Although the device has been described as being intended for protecting the driver of a vehicle, the structure as hereinabove described is equally applicable to an air bag device for a passenger, as shown in FIG. 5. The device shown in FIG. 5 has a bag container 64 holding an air bag in a folded form, and a pair of inflators 54 mounted on the back of the container 64. The structure involving the mounting of each inflator 54 is identical to what has been described with reference to FIGS. 1 to 4. The pins 60 projecting from each inflator 54 are engaged with the spiral slits 58A of the cylindrical walls 56A projecting from the back of the container 64. A lid 66 is provided over the front of the container 64. If the air bag is extended by the inflators 54, it forces the lid 66 to rotate forward to open, and extends out of the container 64 into a cabin.

The device of this invention may further include a gas seal member interposed between the outer periphery of the inflator and the inner periphery of the cylindrical wall of the bag retainer, as shown at 70 in FIG. 1. The gas seal member 70 effectively prevents any leakage of an inflator gas from the device.

As is obvious from the foregoing, according to the inflator mounting structure of the present invention, the inflator can be connected to the bag retainer very easily and quickly by inserting the inflator in the cylindrical wall of the bag retainer, aligning the pins with the slits, and rotating the inflator.

What is claimed is:

1. An air bag device for a vehicle, comprising,
    an air bag holding member for holding an air bag thereon and having an opening with an edge,
    a cylindrical wall projecting from the edge of the air bag holding member to be coaxial with the opening,
    a plurality of slits provided in said cylindrical wall, each slit including a spiral portion extending spirally about an axis of the cylindrical wall and having an inlet and an end portion, and a horizontal portion extending horizontally from the end portion of the spiral portion, said inlet of the spiral portion having a width greater than that of the end portion and gradually decreasing from the inlet to the end portion,
    beveled surfaces for defining each of the spiral portions of the slits and formed on the cylindrical wall, said beveled surfaces facing outwardly of the cylindrical wall and extending from the inlet to the end portion while increasing a thickness from the inlet to the end portion,
    an inflator to be inserted into the opening and the cylindrical wall, and
    a plurality of pins projecting from an outer periphery of said inflator and engaging the respective slits, each pin having an enlarged head with a tapered surface at a side of the inflator so that when the inflator is engaged with the cylindrical wall, the pins can easily enter into the slits and while the inflator is rotated, the pins securely engage the cylindrical wall.

2. An air bag device as set forth in claim 1, wherein said inflator has a plurality of tool engaging grooves at its rear end.

3. An air bag device as set forth in claim 1, wherein said bag holding member is a retainer for an air bag device for a driver.

4. An air bag device as set in claim 1, wherein said bag holding member is a container for an air bag device for a passenger.

5. An air bag device as set forth in claim 1, further comprising a gas seal member interposed between said inflator and said cylindrical wall.

6. An air bag device as set force in claim 1, wherein said cylindrical wall extends downwardly from the air bag holding member, and said inlets of the slits being formed at a bottom edge of the cylindrical wall.

* * * * *